INVENTORS
JOSEPH M. CALLAN
IGNACY GERNER
BY
ATTORNEYS

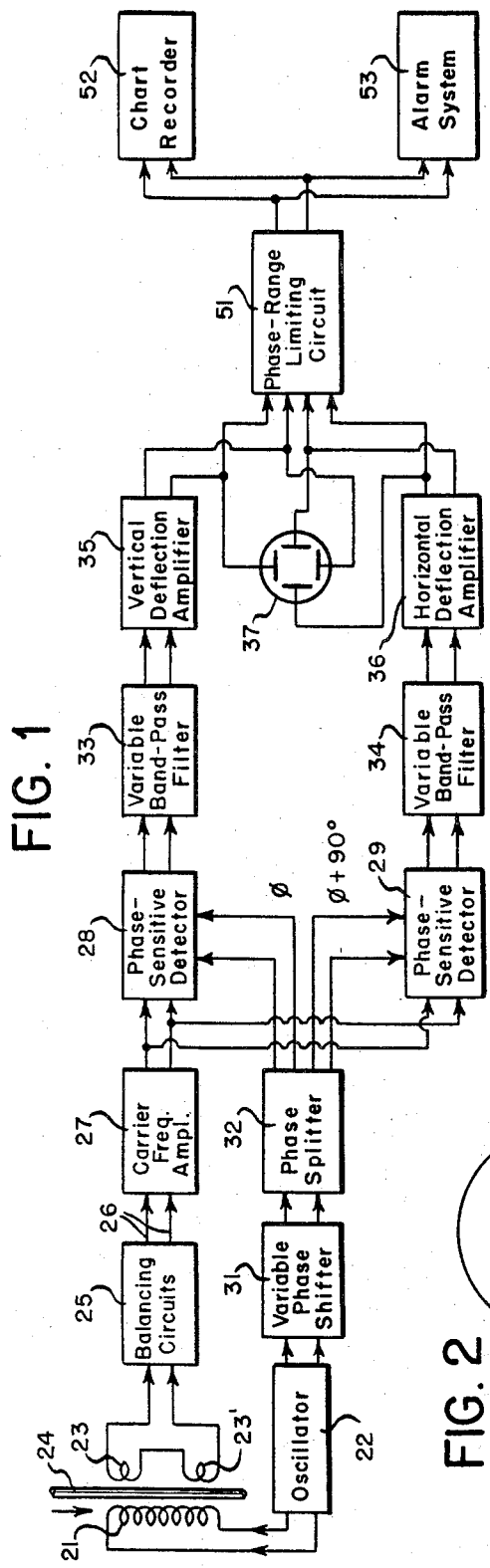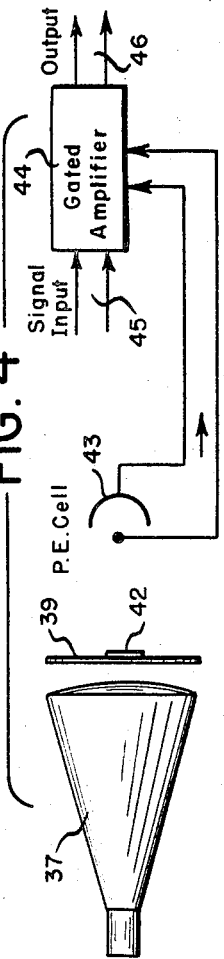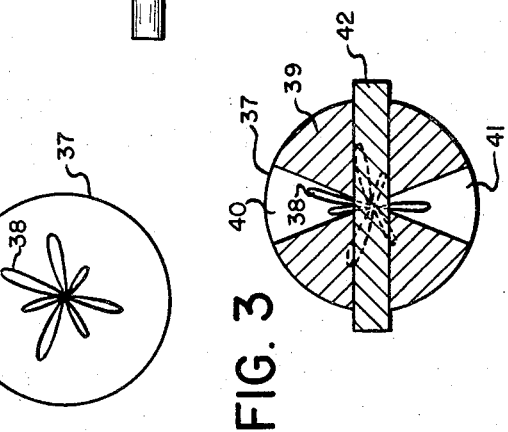

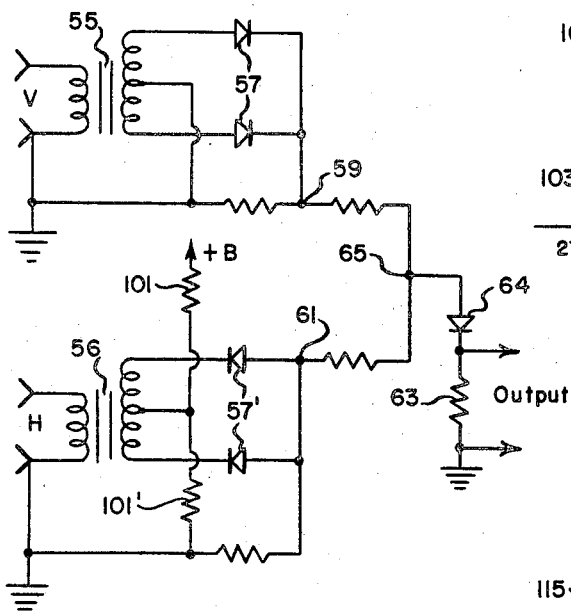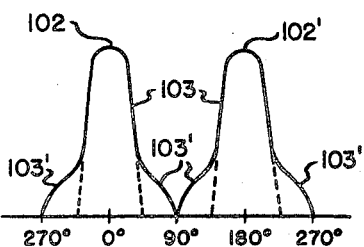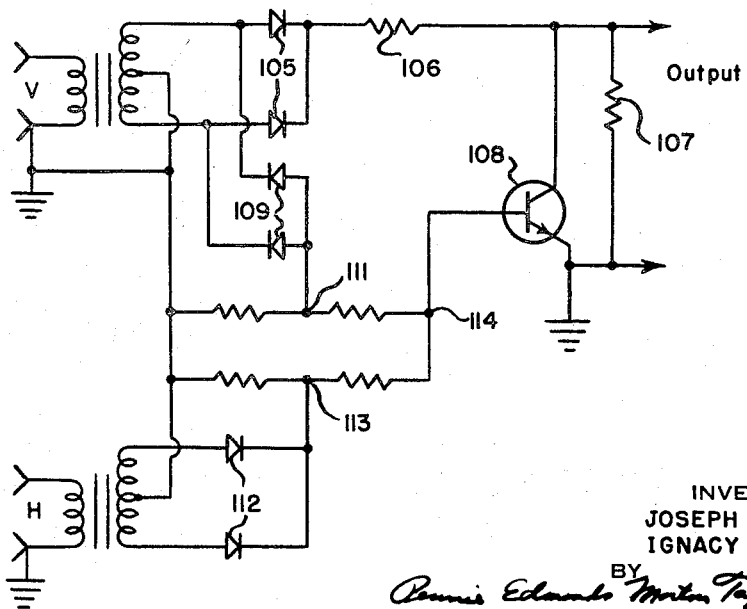

Oct. 8, 1968      J. M. CALLAN ET AL      3,405,354
APPARATUS FOR LIMITING PHASE-ANGLE RESPONSE RANGE, PARTICULARLY
              IN EDDY CURRENT TESTING APPARATUS
Filed July 19, 1965                              7 Sheets-Sheet 5

INVENTORS
JOSEPH M. CALLAN
IGNACY GERNER

BY *Pennie Edmonds Morton Taylor & Adams*

ATTORNEYS

INVENTORS
JOSEPH M. CALLAN
IGNACY GERNER

ATTORNEYS

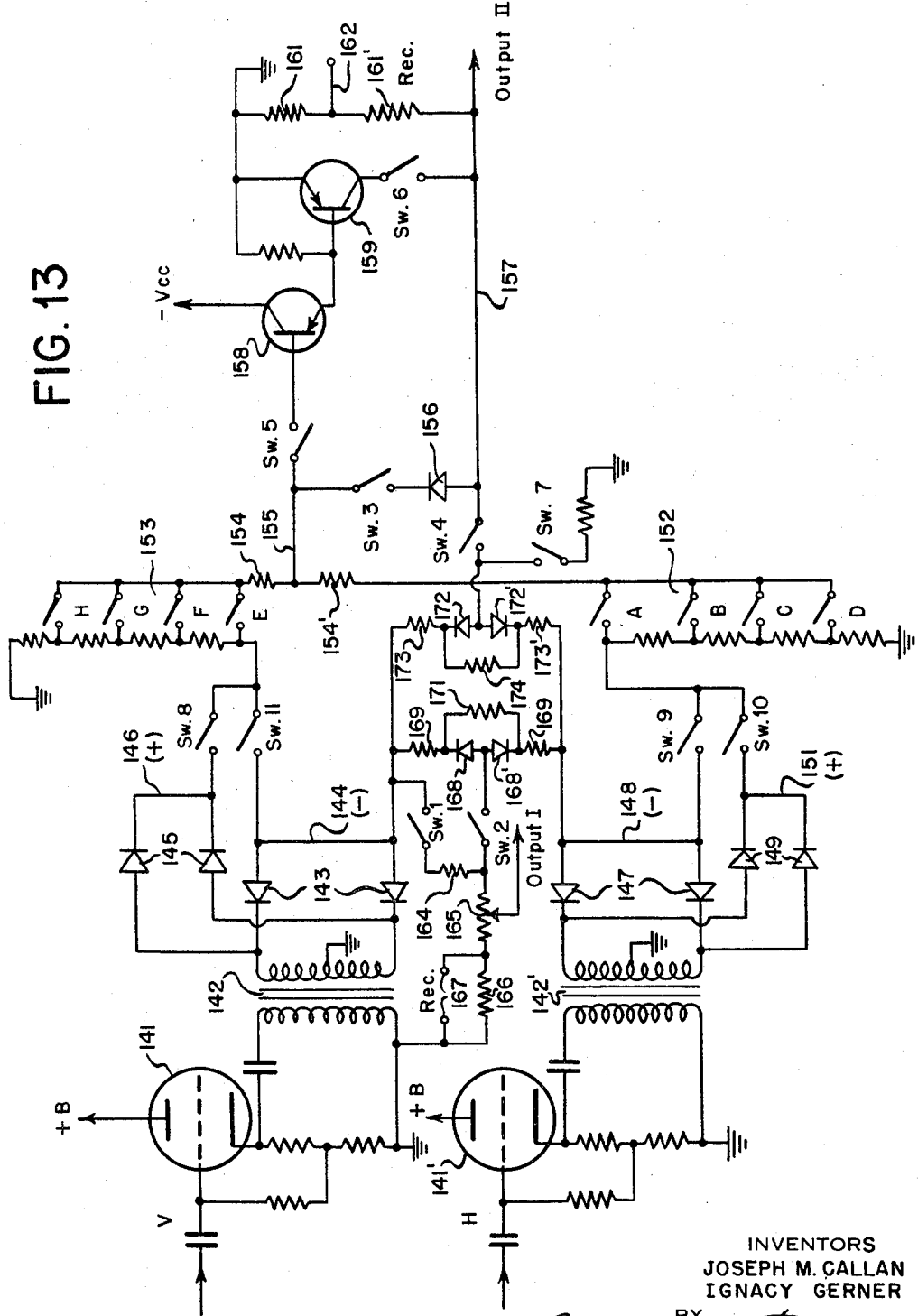

United States Patent Office

3,405,354
Patented Oct. 8, 1968

3,405,354
APPARATUS FOR LIMITING PHASE-ANGLE RESPONSE RANGE, PARTICULARLY IN EDDY CURRENT TESTING APPARATUS
Joseph M. Callan, Pelham Manor, and Ignacy Gerner, Forest Hills, N.Y., assignors to Magnetic Analysis Corporation, Long Island City, N.Y., a corporation of New York
Filed July 19, 1965, Ser. No. 472,955
31 Claims. (Cl. 324—40)

ABSTRACT OF THE DISCLOSURE

In eddy current testing apparatus, signals within certain phase-angle ranges may be unimportant whereas signals within other ranges may be very important. This may also be true in other environments. The present invention utilizes quadrature components of signals to produce an output limited to signals lying within a restricted phase-angle range.

The quadrature signal components may be rectified and subtracted to yield such an output. The phase angle range may be altered by different relative amplification and by delay biasing of one rectified component. By changing the rectifier and subtracting circuits, different phase-angle characteristics may be obtained. Preferably the resultant signal is used to gate one of the quadrature signal components to the output circuit, or to gate an additive combination of the quadrature signals yielding an approximately uniform response independent of phase angle within the pass regions. Other means responsive to the relative amplitudes of the quadrature components may be used to produce the gate signal.

---

This invention relates to limiting phase-angle response range, particularly in eddy current testing apparatus.

Eddy current testing apparatus is now well known, and is particularly useful in the nondestructive testing of conductive objects to determine defects or flaws therein. In such apparatus eddy currents are induced to flow in the object under test, such as by means of a coil energized with alternating current. In the case of objects of uniform cross-section such as bars, tubes, wire, etc., the object may be continuously passed through the coil. In the absence of any variations in the object, the flow of circulating currents will have a uniform pattern. If, however, there are variations due to changes in the material itself, in its dimensions, or defects or flaws therein, the eddy current magnitude or distribution will be altered. Detection coils may be coupled to the object under test so as to obtain an induced voltage varying in accordance with the flow of eddy currents. In one type system a pair of secondary coils are arranged inside the primary coil and coaxial therewith, the secondary coils being connected in series to produce a null output when the eddy current field is constant. Then, any discontinuity in the material produces a modulated alternating current signal in the output of the detector coils.

In general, the output of the detection coils will vary in amplitude or phase, or both, as a nonuniform rod or tube passes through the coil assembly. Depending on the application, some types of output signals will be due to changes in the object under test which are acceptable. For example, these may be minor diameter changes or conductivity variations. Other types of signals may indicate defects such as pits, seams, cracks, etc. which are objectionable. It is hence necessary to use selective means to distinguish between signals representing acceptable variations and those representing objectionable defects. Such selective means may include using different test coil geometries, filtering the demodulated detected signal, and utilizing differences in phase.

The present invention relates to the use of phase selectivity as part of the selective process. It is found in practice that, depending on the test equipment and the object under test, certain phase angle ranges may result from non-objectionable changes in the object under test, whereas other phase angle ranges may be very important in indicating objectionable defects. It is a primary object of the present invention to provide means for limiting the phase angle response range to the region of interest.

In known types of eddy current testing apparatus quadrature components of the test or pickup signal are produced by using phase-sensitive detectors supplied with the signal and the excitation frequency, one or the other being phase-split into 90° components, and the resultant quadrature signal components supplied to a cathode-ray tube to produce a polar coordinate display of the signal amplitude and phase. The present invention utilizes such quadrature signal components to produce an output limited to signals lying within a restricted phase angle range.

In accordance with one aspect of the invention this is accomplished by applying the quadrature signal components to respective rectifier circuits and subtracting one rectified signal component from the other to yield a resultant output signal of limited phase angle range. By appropriate amplification or attenuation of one component relative to the other before subtraction, or by biasing one rectified component to delay the subtraction until it has reached a desired amplitude, the width and shape of the phase-angle pass regions may be altered.

It is preferred, however, to utilize the signal resulting from such subtraction to gate a circuit to which at least one of the quadrature signal components is applied, so as to avoid attenuating the signal within the gated pass region. Although the gate signal is preferably produced by a subtraction procedure, if desired it could be produced by other means responsive to the relative amplitudes of the quadrature signal components so as to produce a gate signal when the signal represented by the quadrature components lies within a limited phase angle range. The signal passing through the gate circuit under the control of the gate signal may be one of the quadrature signals, before or after rectification, or may be an additive combination thereof yielding an approximately uniform response independent of phase angle within the pass regions.

Some types of eddy current test apparatus operate as comparators, that is, an object is placed in the coil structure and the resultant signal compared in amplitude or phase, or both, with that of an acceptable object. The invention may be employed in such apparatus to limit the phase angle response range. Since the signal will be constant in amplitude and phase during a given measurement, the outputs of the quadrature detectors may be processed on a D-C basis.

The invention will be described in connection with a number of specific embodiments thereof wherein the principles of the invention will be explained and various modifications thereof illustrated.

In the drawings:

FIG. 1 is a block diagram of an eddy current test apparatus in which the invention may be employed;

FIG. 2 shows an illustrative polar display of signals having different phase angles, obtained with the apparatus of FIG. 1;

FIG. 3 shows the use of masks to confine observation of the polar display to the desired region;

FIG. 4 shows the use of a mask to gate an amplifier through which a demodulated signal is passing, and FIG.

Figure 5:
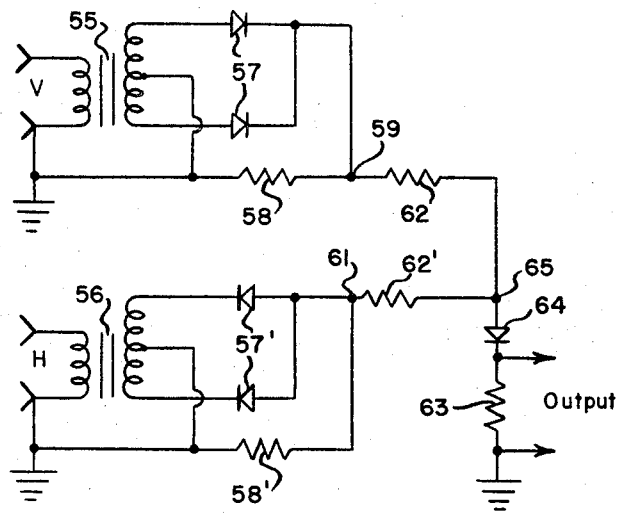
Figure 6:
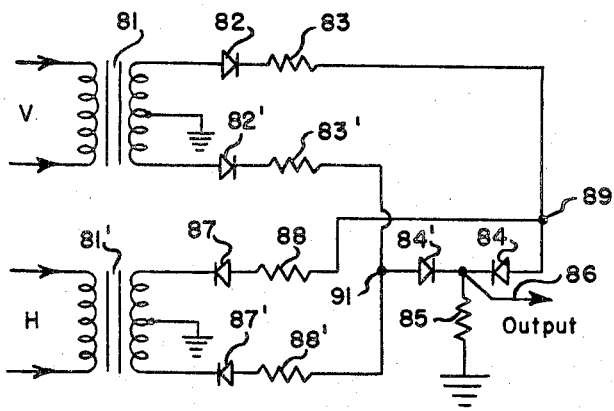
Figure 6A:
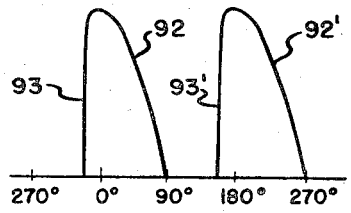
Figure 7:
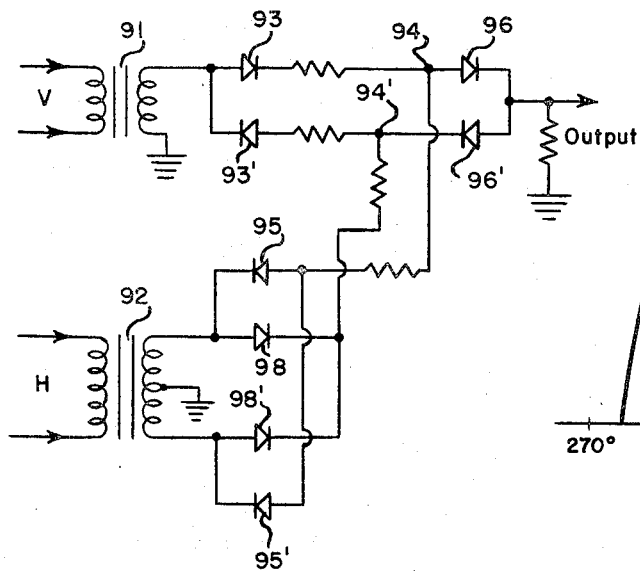
Figure 7A:
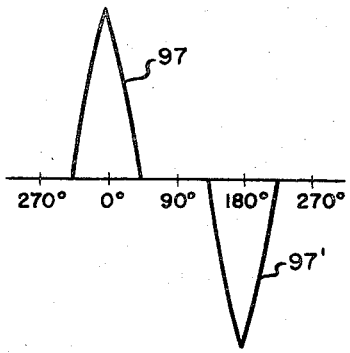
Figure 10:
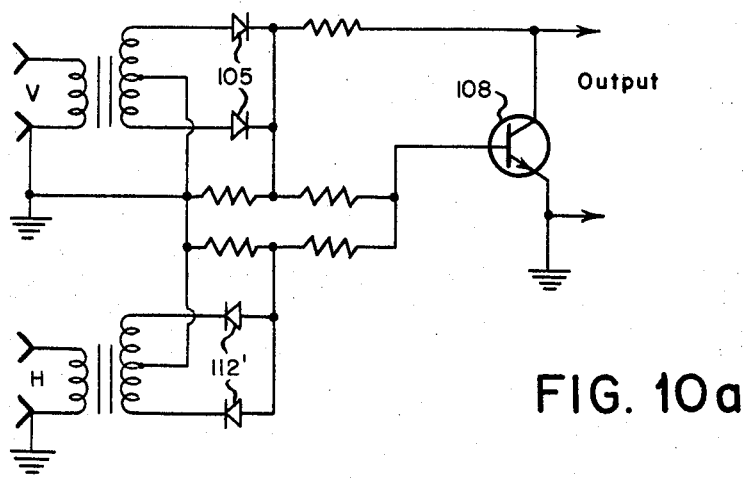
Figure 11:
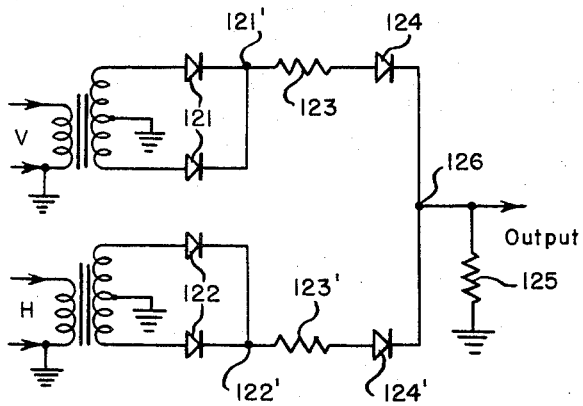
Figure 10A:
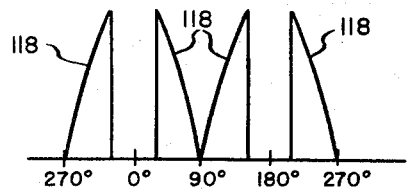
Figure 11A:
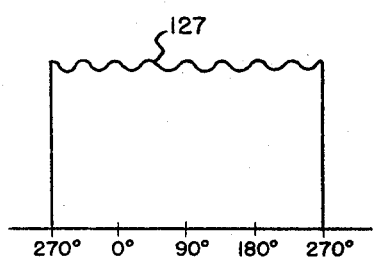
Figure 12:
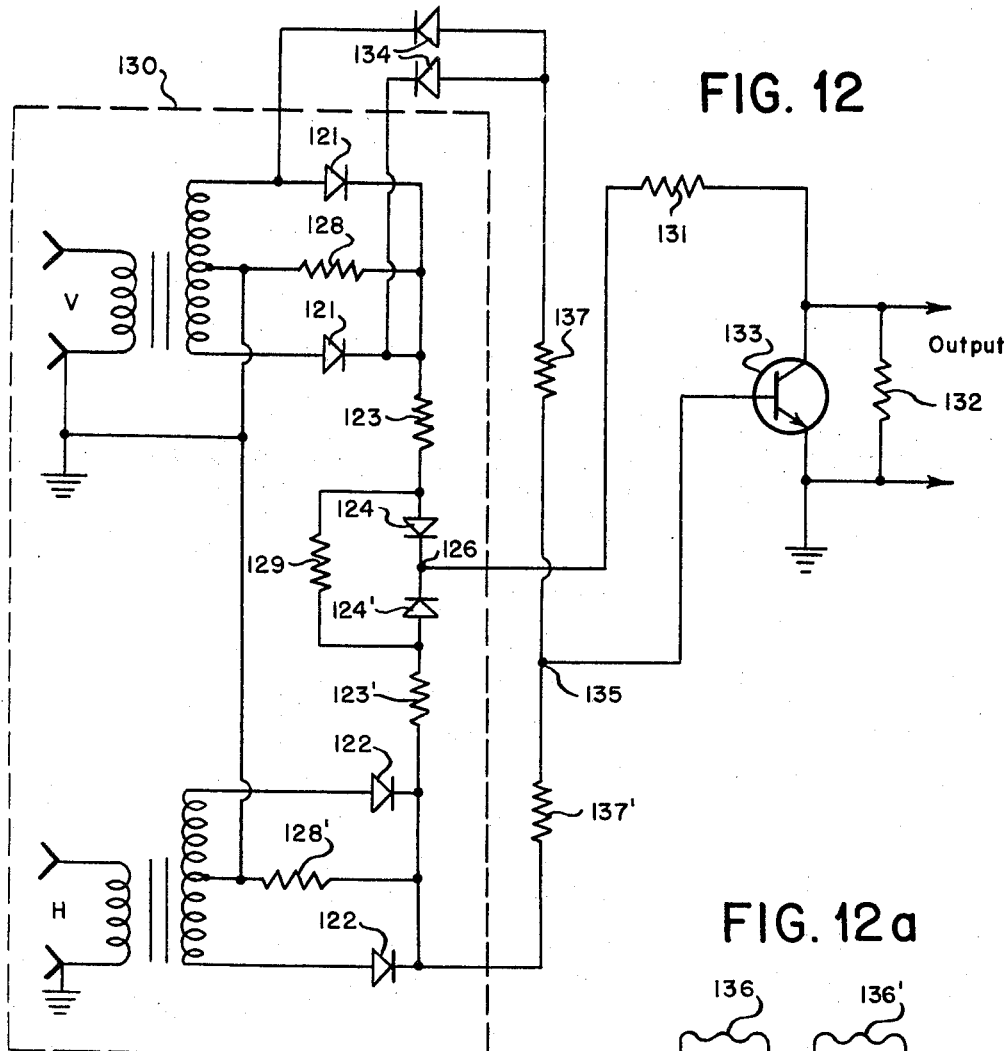
Figure 12A:
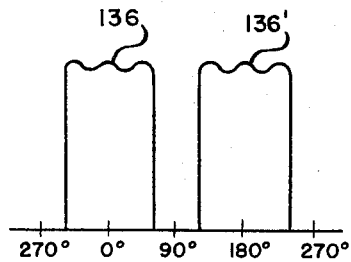

4a illustrates the resultant limiting of the phase angle response range;

FIG. 5 illustrates apparatus for subtracting quadrature signal components to limit the phase angle response range and FIGS. 5a through 5d illustrate the type of response characteristics which may be obtained therewith;

FIGS. 6, 7 and 8 show modifications of the arrangement of FIG. 5 to obtain various phase range response characteristics as shown in FIGS. 6a, 7a and 8a, respectively;

FIG. 9 shows an embodiment using the subtraction of quadrature components to gate one quadrature component, and FIG. 9a illustrates the results thereof;

FIG. 10 is a modification of FIG. 9 to produce a characteristic such as shown in FIG. 10a;

FIG. 11 shows an arrangement for producing an output characteristic substantially independent of phase angle, as illustrated in FIG. 11a;

FIG. 12 shows an embodiment in which the arrangement of FIG. 11 is gated to produce a characteristic illustrated in FIG. 12a; and FIG. 13 shows an embodiment in which various output characteristics illustrated in preceding embodiments may be obtained by switching.

Referring now to FIG. 1, an eddy current testing apparatus of known type is shown, in which the phase-range limiting circuits of the invention may be employed. The primary coil 21 is supplied with alternating current of desired frequency from an oscillator 22. A pair of secondary coils 23, 23' are connected in series opposition to serve as a null-type detector coil arrangement. The object under test is illustrated as a rod 24 passing continuously through the coil assembly as indicated by the arrow. In practice, the pickup coils 23, 23' may be positioned inside the primary coil 21, coaxial therewith, and spaced apart in the axial direction. The rod 24 would then be arranged to pass along the axis of the coil assembly.

The detector coils are connected to balancing circuits 25 to yield a substantially zero output voltage in output lines 26 when rod 24 is completely uniform, and also to provide any impedance matching required. If a portion of rod 24 is nonuniform, or has defects or flaws therein, a pickup signal will be produced in the form of a carrier signal at the oscillator frequency, modulated in amplitude or phase, or both. With uniform movement of the rod through the coils, a given defect will first arrive at one coil 23 and then at the other coil 23', thereby commonly producing a first signal of given amplitude and phase and then a second signal of similar amplitude but opposite phase.

Other types of test coil arrangements are known, such as a pair of coils axially separated and connected as two arms of a bridge circuit energized from an alternating current source. The output of the bridge is similar to that described above, that is, it is a carrier signal modulated in amplitude and phase by defects or flaws.

Returning to FIG. 1, the pickup signal may be quite small, and is accordingly amplified in a carrier frequency amplifier 27. The amplified signal is then supplied to two phase-sensitive detectors 28 and 29 in respective vertical and horizontal channels. The output of oscillator 22 is fed through a variable phase shifter 31 to a phase splitter 32 which develops quadrature reference control signals denoted $\phi$ and $\phi+90°$. These are supplied to respective phase-sensitive detectors 28 and 29 so that the outputs of the detectors represent quadrature components of the modulated carrier signal from the pickup coils. The respective quadrature components are fed through variable bandpass filters 33 and 34 to eliminate any residual carrier frequency signal, and to emphasize variations in a desired modulation frequency range. The quadrature signals are then supplied to respective vertical and horizontal deflection amplifiers 35 and 36, and then to vertical and horizontal deflecting plates of cathode-ray tube 37.

FIG. 2 illustrates a display that may be seen on the face of tube 37. With quadrature components supplied to the two sets of deflection plates, a polar display will be obtained wherein the angle of a particular signal, say 38, will be the phase angle from a reference angle, and the deflection from the center of the tube will give the signal amplitude. Depending on the types of defects, signals may be obtained with various phase angles and amplitudes as illustrated, it being understood that different signals occur at different times.

By adjusting the variable phase shifter 31, the signals depicted in FIG. 2 may be rotated so that the center of the phase angle range of interest may be in the vertical direction, or in the horizontal direction, or at any other desired angle.

FIG. 3 shows the face of the cathode-ray tube 37 masked by 39 so that only segments 40 and 41 are visible. Thus only signals whose phase angles lie within the segments will be visible. Two segments displaced by 180° are shown, since commonly a defect in an object passing through the coil system will first produce an output signal of one polarity and then an output signal of opposite polarity, both being equally significant. A single segment could be used if desired. Frequently signals of small amplitude are unimportant regardless of their phase, and accordingly the central portion of the tube face may be masked as by mask 42.

The masking shown in FIG. 3 serves to confine attention only to signals lying within a desired phase angle range, and having amplitudes above a minimum level. However, it has the serious disadvantage that it would require continuous attention on the part of the operator, and making a record of the observed signals would be impractical. A photoelectric cell could be arranged to respond to signals appearing within the open sectors of FIG. 3. However, in such case amplitude information would be lost unless a number of photocells were arranged to respond to different portions of the open segments, which is undesirably complicated. Further, it is frequently desired to have the entire display visible to the operator, such as shown in FIG. 2, even though only signals within a given phase angle range require recording.

Referring now to FIG. 4, cathode-ray tube 37 is shown with masks 39 and 42 arranged as in FIG. 3. A photoelectric cell 43 is provided to respond to any signals within the open segments. Such signals will appear only when the relative amplitudes of the V and H quadrature components lie within a range corresponding to the phase angle range of the open segments, since the relative amplitudes determine the polar angle of the signal as displayed. Hence the photoelectric cell 43 will respond on an instantaneous basis to the occurrence of any signals within the selected phase angle range. The output of the photoelectric cell is arranged to gate an amplifier 44. The input 45 to the gated amplifier may be either the output of the vertical or horizontal deflection amplifier in FIG. 1, or a combination of the two outputs as explained later in connection with FIG. 11. Thus, the output 46 will be the portion of the vertical and/or horizontal signal which lies within the open areas of the mask. Hence, amplitude information will be preserved.

FIG. 4a illustrates this situation. Without the gating, the output characteristic of amplifier 44 for one quadrature signal input is represented by the full-line curve 47. Assuming that the vertical quadrature component is being supplied to the amplifier, this curve is given by the equation:

$$E_v = \overline{A} \cos \theta$$

In this equation $E_v$ is the vertical component voltage output of the amplifier, $\overline{A}$ is the absolute amplitude of the signal, and $\theta$ is the phase angle of the component as measured from the vertical direction on the oscilloscope. As will be apparent, at 0° and at 180° the signal component is passed with amplitude $\overline{A}$. As the phase angle of the signal changes, the quadrature component input to amplifier 44 decreases, and hence the output decreases. At 90° and 270° there will be no signal output regardless of the absolute amplitude of the signal. As will be understood, however, at any other phase angle the output $E_v$ will vary with the absolute amplitude. Thus, large amplitude signals at angles in the vicinity of 90° may give outputs of the same order of magnitude as smaller amplitude signals in the vicinity of 0°. Consequently, the phase selectivity exhibited by the full line curve 47 is unsatisfactory.

With the gating shown in FIG. 4, the output of the amplifier may be confined to signals whose phases lie within the ranges shown by the dash lines 48 and 48' in FIG. 4a. Here the signals at or near 0° and 180° will be passed with substantially their full amplitude, whereas signals outside of these regions will be eliminated regardless of their amplitude. By adjusting the phase shifter 31 so that the signals of interest have phases lying within bands 48, 48', the output 46 of gated amplifier 44 will represent only defects of significance in the particular setup, which may then be recorded, used to actuate an alarm, etc.

If desired, the open and masked sectors could be interchanged, and the gate arranged to be closed by a signal in the open sector.

Although the arrangement of FIG. 4 is feasible, it is somewhat inconvenient in use and, if a full display such as shown in FIG. 2 is desired, an additional cathode-ray tube setup is required. Accordingly, it is preferred to employ all-electronic arrangements as described in subsequent embodiments. In these subsequent embodiments both the outputs of the vertical and horizontal amplifiers are used in order to limit the phase-angle response range. Accordingly, FIG. 1 includes a phase-range limiting circuit 51 supplied with the outputs of both the vertical and horizontal deflection amplifiers 35 and 36. The output of circuit 51 may be used as desired, and FIG. 1 shows the signal recorded by chart recorder 52, and also used to actuate an alarm system 53.

Referring now to FIG. 5, one embodiment is shown for the phase range limiting circuit 51 of FIG. 1. The outputs V and H of the vertical and horizontal deflection amplifiers are supplied to respective transformers 55 and 56. The secondaries of the transformers are center-tapped and connected in full-wave rectifier circuits. The upper circuit includes diodes 57 and resistor 58, the diodes being poled to develop a positive polarity signal at point 59. The lower circuit is similar and includes diodes 57' and resistor 58'. The diodes are reversed, however, so that the voltage at point 61 is of negative polarity. These points are connected to a subtracting circuit including similar resistors 62, 62' and output resistor 63. A diode 64 is inserted in series so that an output is developed only when the voltage at point 65 is positive to ground. As will be understood by those skilled in the art, resistors 62, 62' and 63 actually function to add two rectified signal components of opposite polarity. However, since the net result is to reduce the amplitude of one component, say the V component, as a function of the angle of the signal represented by the quadrature components, the term subtracting is herein used since it expresses more clearly the result obtained.

Figure 5A:
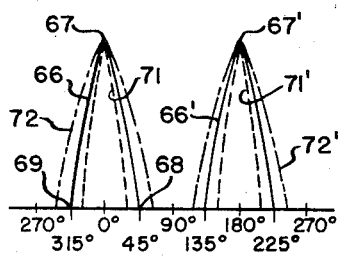

FIG. 5a shows by full line curves 66, 66' the output characteristic of FIG. 5, assuming equal amplifications for horizontal and vertical signal components. With a signal at 0° (with respect to the vertical) a positive signal will be developed at point 59. Since for this phase angle there will be no horizontal component, the signal at point 61 will be zero. Accordingly, the signal will appear in the output with full amplitude as shown at 67 in FIG. 5a. For a signal of the same absolute amplitude but having a phase angle of 45°, both vertical and horizontal components will be equal to 0.707A and accordingly the voltages at points 59 and 61 will be equal but of opposite polarity. Hence, the signals will cancel at point 65 and the output will be zero as indicated at 68 in FIG. 5a. Similarly, for an input signal having a phase angle of 315°, the signals at point 65 will cancel and the output will be zero, as shown at 69 in FIG. 5a.

For a signal having a phase angle of 180°, the operation of the circuit of FIG. 5 will be the same as at 0°, due to the full-wave rectifying action in the vertical circuit. Similarly, since the horizontal circuit is also full-wave rectifying, the operation will be the same at 135° and 225° as at 315° and 45°, so that curve 66' is similar to curve 66.

Between 45° and 135°, and similarly between 225° and 315°, the horizontal component will be larger than the vertical component. Thus, the difference voltage at point 65 will be negative and diode 64 will not pass the signal to the output circuit. Accordingly, the overall response is limited to signals having phase angles in the ranges 315°–45° and 135°–225°.

The values of the resistors in FIG. 5 may be selected in accordance with known rectifier design procedures. As an example for illustration only, in one embodiment resistors 58, 58' were 100K, resistors 62, 62' were 50K, and resistor 63 was 100K.

The phase-angle range within which signals are delevered to the output circuit of FIG. 5 may be reduced or increased by changing the relative amplitudes of the vertical and horizontal signal components before subtraction. Thus, assuming that the vertical component remains unchanged, increasing the amplification of the horizontal component will cause the negative potential at point 61 to increase more rapidly with phase change than before, thus yielding the dash curves shown at 71 and 71' in FIG. 5a. With sufficient amplification, cutoff phase angles as small as 5° or less at either side of 0° or 180° are obtainable, thus providing a high degree of phase selectivity. Similarly, reducing the amplification of the horizontal component will cause the negative voltage at point 61 to be developed more slowly with phase change, thus leading to characteristics such as shown by dot-dash curves 72 and 72' in FIG. 5a. In the extreme, with the horizontal amplification reduced to zero, the characteristic will be as shown by curve 47 in FIG. 4a.

It will be understood that the horizontal component could be fed to the output after subtracting the vertical component therefrom, by suitable choice of diode polarities. Also, either component could be fed to the output circuit in positive or negative polarity, as desired for subsequent utilization, by suitable choice of diode polarities.

Figure 5B:
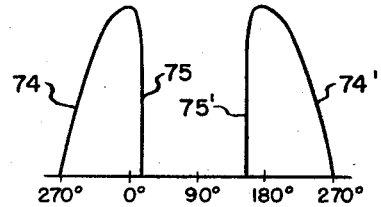

The shape and width of the phase-limited characteristics may also be changed by removing a diode from one or both of the vertical and horizontal circuits of FIG. 5. FIG. 5b shows the type of characteristics obtainable by removing one of diodes 57' in the horizontal circuit. The horizontal rectifier circuit will then be half-wave. During the half-cycle when no horizontal rectification takes place, assumed to be from 180° to 0°, the output will be as shown at 74 and 74' in FIG. 5b, similar to the first and last quarter-cycles of waveform 47 in FIG. 4a. During the other half-cycle when the horizontal rectifier is operating, assumed to be from 0° to 180°, a negative signal will be developed at point 61 as described before. This gives a phase cutoff characteristic as shown by lines 75 and 75' in FIG. 5b. The slope of these lines is quite steep, as illustrated, corresponding to a horizontal signal amplification considerably greater than the vertical signal amplification. This has been explained in connection with curves 71, 71' in FIG. 5a.

Figure 5C:
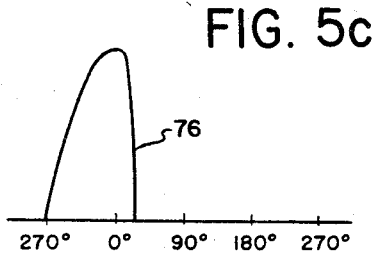

FIG. 5c shows the result of removing one of the diodes 57' in the horizontal circuit and also one of diodes 57 in the vertical circuit. Here a positive signal at point 59 will be developed only for one-half cycle since the vertical circuit will be half-wave rectifying, and curve 76 will correspond to one of the curves in FIG. 5b. The particular curve will depend upon which diodes are removed.

Figure 5D:
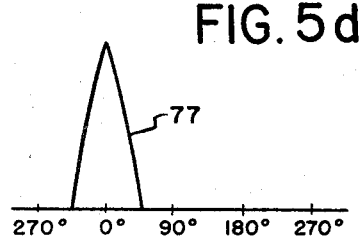

FIG. 5d illustrates the operation when one of diodes 57 is removed in the vertical circuit, leaving both diodes 57' in the horizontal circuit. A positive output at point 59 will be developed only for one-half cycle in the vertical circuit, assumed to be from 270° to 90°. During this half-cycle, the circuit will function as described before, leading to a characteristic 77 similar to 66 in FIG. 5a.

Referring now to FIG. 6, the vertical signal component V is supplied to transformer 81 having a center-tapped secondary. Diodes 82 are connected to the outer ends of the secondary and through respective resistors 83, 83' and diodes 84, 84' to the output resistor 85. The horizontal signal component is supplied in a similar fashion through transformer 81', diodes 87, 87', resistors 88, and diodes 84, 84' to the output circuit. However, diodes 87, 87' are reversed with respect to diodes 82, 82'.

By itself, the vertical rectifier circuit would function as a full-wave rectifier to deliver an output to line 86. However, the output of the horizontal rectifier circuit would be blocked by the opposite polarities of diodes 87, 87' and 84, 84'. It is therefore simpler to consider the vertical circuit as a pair of half-wave rectifiers producing half-wave signals of like polarity for opposite phases of the V component, and similarly for the horizontal circuit except that the polarity is reversed. Then, the circuit is arranged to separately subtract respective half-wave rectified signals of the H component from those of the V component. This will be explained in more detail.

Assume that the polarities of the transformers are such that the top terminal of the secondary of the V transformer 81 is positive from 270° to 90° and that of the H transformer 81° positive from 0° to 180°. Then in the V circuit the signal on diode 82 is in the conductive direction (positive) from 270° to 90°, and an diode 82' from 90° to 270°. In the H circuit, the signal on diode 87 will be in the conductive direction (negative) from 180° to 0°, and on diode 87' from 0° to 180°.

Then, from 0° to 90,° diode 82 will be conducting but diode 87 will not be, giving a signal at point 89 which is only the vertical component. Diode 82' will not be conducting and, although the signal applied to diode 87' is in the conducting direction thereof, diode 84' will block the resultant negative signal applied to point 91. Thus, the signal in output line 86 will be as shown by line 92 in FIG. 6a. Between 270° and 0°, diode 82 will still conduct, but diode 87 also will conduct and the resultant negative voltage from the horizontal component will subtract from the positive voltage of the vertical component at point 89, thus producing a rapidly falling characteristic with phase as shown by line 93 in FIG. 6a. The slope of this line will depend on the relative amplification of horizontal and vertical components as discussed above.

Between 180° and 270°, a positive vertical component will be supplied through diode 82' to point 91, but diode 87' will not conduct. Thus the signal at point 91 will pass through diode 84' to the output line as shown at 92' in FIG. 6a. Between 90° and 180°, diode 87' in the horizontal circuit will be conducting to subtract from the vertical voltage at point 91, giving line 93' in FIG. 6a.

As will be observed, the characteristics in FIG. 6a are asymmetrical in the same direction, so that a defect producing successive signals of opposite phase lying within the pass regions will be indicated by like-amplitude responses. This may be contrasted with FIG. 5b wherein the asymmetry is in opposite directions so that signals of opposite phase corresponding to the same defect will have different output amplitudes, except at 0° and 180°.

The embodiments of FIGS. 5 and 6 yield outputs of one polarity only, positive as specifically shown. Thus, signals in the region of 0° have the same polarity as those in the region of 180°. On the face of the oscilloscope, however, they are diametrically opposite. It is sometimes desirable to record signals in positive and negative polarity for opposite phase conditions. Also, such signals may be desirable to facilitate subsequent filtering, etc. This can be accomplished in the arrangements of FIGS. 5 and 6 by employing two of the circuits shown, eliminating one diode in the vertical rectifier of each circuit so that they respond respectively to opposite polarities of the V component, selecting diode polarities to give outputs of opposite polarity, and combining the outputs. FIG. 7 is such a combination of two FIG. 5 circuits, but is simplified to eliminate unnecessary components.

Referring to FIG. 7, the vertical signal component V is applied to a single-ended transformer 91 and the horizontal component H to a center-tapped transformer 92. When V is positive at the secondary of 91, diode 93 conducts to pass the positive voltage to point 94. A full-wave rectified H component in the negative direction is developed by diodes 95, 95' and subtracts from the positive V component at point 95, and the resultant is passed through diode 96 to the output circuit. This gives the characteristic 97 in FIG. 7a. Similarly when V is negative at the secondary of 91, a negative V voltage is passed by diode 93' to point 94'. A positive full-wave rectified voltage is produced from the H component by diodes 98, 98' and is subtracted from the V component at point 94', and the resultant passes through diode 96' to the output circuit. This gives the characteristic 97' in FIG. 7a.

The phase-angle range limiting described in the embodiments of FIGS. 5-7 can be modified by introducing a bias in the H circuit to delay the subtractive action until the H component exceeds a predetermined level.

FIG. 8 is an example of such a modification, and is like FIG. 5 except that the center tap of transformer 56 is positively biased by +B through resistors 101, 101'. Accordingly a negative voltage from the H component is not developed at point 61 until it exceeds the bias level. A representative characteristic is shown in FIG. 8a. Near 0° and 180° the H component will be small and, due to the delay bias, will not affect the passage of the V component to the output circuit. Thus the regions 102, 102' are less sharp than in FIG. 5a. As soon as the H component exceeds the bias level, it begins to subtract from the V component giving the relatively steep slopes 103.

If the signal were considered to be of constant amplitude but changing angle, the steep slopes 103 of the pass characteristic would continue to the base line as indicated by the dotted continuations thereof. However, in practice, a given signal will frequently be of pulse type which starts at a low value, grows to a maximum value, and then returns to a low value. On the face of the cathode ray tube in FIG. 1 this would correspond to a signal which starts at the center and moves radially outward to a maximum and then returns to the center. With such a signal, the bias in the H rectifier circuit of FIG. 8 will prevent the H component from subtracting from the V component until the bias level is exceeded, and the subtraction will cease when the signal falls below the bias level. As a result, small portions of the V signal may pass to the output circuit even though the angle approaches 90° or 270°. This is illustrated by the shoulders 103' in these regions.

Also, for a given bias, the angles at which the H component begins to subtract from the V component to produce slopes 103 will depend on signal amplitude. Thus, unlike preceding embodiments, the width and shape of the phase-angle pass regions is to some extent a function of signal amplitude as well as phase.

If it is desired to narrow the pass regions, this can be accomplished by increasing the amplification in the H channel so that the H component exceeds the bias value and subtracts from the V component at angles closer to 0° and 180°.

Accordingly, the shape of the characteristic will depend on the bias voltage and relative amplification for the V and H components, as well as being dependent to some degree on signal amplitude.

In FIGS. 5-7 the effect of the H component is to reduce the amplitude of the V component in the output circuit except at angles where H is zero, due to the direct subtraction employed. This is also true of FIG. 8 when the H component exceeds the bias level. While this type of characteristic may be desired for some applications, it is frequently more advantageous to avoid any attenuation of the V component until the cutoff phase angle is reached, and to completely eliminate the V component beyond cutoff. This may be accomplished by using the subtraction of H from V components to develop a gate signal.

The signal to be gated may be the V signal from the vertical deflection amplifier 35 in FIG. 1, the H signal from amplifier 36, or a combination of the two as described in connection with FIG. 4. If the V or H signal is gated, the output may have both positive and negative signals, as mentioned above. It is frequently desirable to have an output of only one polarity, positive or negative as the case may be. For example, this facilitates actuating an alarm system such as shown in FIG. 1. Accordingly the following embodiments show gating circuits utilizing one or both of the V and H rectifier circuits to furnish the signal to be gated.

Referring to FIG. 9, the V component is full-wave rectified by diodes 105 and supplied through resistor 106 to resistor 107 across which the output voltage is developed. Transistor 108 has its emitter-collector circuit shunted across resistor 107 so that, when it conducts, it substantially short-circuits the resistor 107 and cuts off the output voltage.

Transistor 108 is here shown as of the NPN type to agree with the positive potential at its collector, and conducts heavily when its base is substantially positive to its emitter. The base potential is developed by a circuit similar to FIG. 5, except that the polarity of the diodes in the V and H channels is reversed to provide gating at the desired phase-angle ranges. Thus the V component is full-wave rectified by diodes 109 to produce a negative signal at point 111, and the H component is full-wave rectified by diodes 112 to produce a positive signal at point 113. These are subtracted at point 114 and, when the H signal exceeds the V signal, the base of transistor 108 is positive and the transistor cuts off the output. The voltage at point 114 will vary with phase angle similarly to that shown in FIG. 5a, except that the curves will be inverted. Thus in the region from 315° to 45°, and 135° to 225°, for the full line curves corresponding to equal amplifications in V and H channels, the voltage at point 114 will be negative and the V signal will pass to the output circuit. Between 45° and 135°, and between 225° and 315°, the voltage at point 114 will become positive and cause transistor 108 to conduct and cut off the output.

The resultant characteristic is illustrated by the full line curves 115, 115' in FIG. 9a. As will be observed, the center portions are similar to the curves in FIG. 4a, indicating no attenuation of the V component due to the limiting of the phase-angle range. However, the skirts 116 are substantially vertical, giving a sharp phase-angle cutoff. By increasing the amplification of the H component, the skirts may be moved inward as shown at 116', and by reducing the amplification they may be moved outward as shown at 116". This is analogous to the changes shown in FIG. 5a, but is accomplished without changing the central regions of the curves. Hence this type of phase-angle range limiting is very useful.

If it is desired to produce gating regions as shown by the baseline intercepts of the characteristics in FIGS. 5b, 5c, 5d, the portion of FIG. 9 which produces the gate signal may be modified as discussed in connection with FIG. 5. Similarly, gating regions such as shown by the baseline intercepts of FIG. 6a may be obtained by using the FIG. 6 arrangement to produce the gating signal, and reversing diode polarities as required to produce the proper polarity of gating signal. The other subtracting arrangements described could also be used if desired, with appropriate modifications as required.

It may sometimes be useful to interchange the pass and rejection phase-angle range bands of FIG. 9a to obtain a characteristic such as shown in FIG. 10a. This may be accomplished by reversing the diodes 109 and 112 in FIG. 9. Since diodes 109 will then have the same polarity as diodes 105, one pair may be eliminated to yield the circuit of FIG. 10. With this arrangement the positive full-wave rectified V signal will exceed the negative full-wave rectified H signal in the region of 0° and 180°, thus causing transistor 108 to conduct and eliminate the V signal in the output circuit. When the H signal exceeds the V signal the transistor will be cut off, yielding the pass characteristics illustrated at 118.

In addition to selectively passing signals within only a selected phase-angle range, it may be desired in some cases to pass signals in the selected range with approximately their full absolute amplitude rather than the vertical (or horizontal) projection thereof. This may be accomplished by combining the V and H signals to produce a characteristic which is of relatively constant amplitude regardless of phase, and then employing gating to limit the phase-angle range.

FIG. 11 shows a circuit yielding such a characteristic. The V and H components are each full-wave rectified in like polarity by pairs of diodes 121 and 122, and then supplied through respective series resistors 123, 123' and diodes 124, 124' to the common output resistor 125. The V and H components are summed at point 126 provided the smaller component is large enough to make a contribution. At 0° where the V component is assumed to have its maximum value, the H component will be zero and the output will be the V component at point 121' reduced by the voltage divider action of resistors 123 and 125. Diode 124' blocks current from point 126 into the H circuit. Similarly, at 90° where the V component is zero and the H component maximum, the output voltage will be the H component at point 122' reduced by the voltage divider action of resistors 123' and 125, diode 124 blocking current from point 126 into the V circuit.

At a small angle from 0°, the V component at point 121' will develop a voltage at point 126 exceeding the H component at point 122', and diode 124' will prevent the small H component from making any contribution to the output. As the angle from 0° increases, the voltage at point 126 due to the V component will decrease until it becomes less than the H component at point 122', whereupon the H component will start making a contribution to the output voltage. At 45° both V and H components will be equal (0.7 of their maximum values) and will contribute equally. As the angle increases the H component will contribute more than the V component until, shortly before 90° is reached, the V component will no longer be able to contribute. When the angle increases sufficiently beyond 90°, the V component will again start contributing, and the process will repeat through the remaining angles.

The angles at which the V or H components will cease contributing, or start contributing, will depend on the relative value of resistors 123, 123' and that of 125. By properly proportioning the resistors, a nearly constant output independent of phase angle can be obtained as illustrated in FIG. 11a. For example, if resistors 123 and 123' are equal, and are 1.41 times the value of resistor 125, and if other resistances are neglected and the diodes are considered ideal, the characteristic 127 varies only about ±4% over the full 360° depicted. These values of resistors are so chosen that the responses at 0°, 45° and 90°, and multiples thereof, are exactly equal. The minimum amplitude occurs at intermediate angles. Because of lack of perfection of the diodes used, transformer unbalance and other imperfections, it is frequently desirable to insert additional resistors to improve the overall operation. This will be discussed in connection with FIG. 12.

Referring now to FIG. 12, in the dash-line box 130 the pairs of diodes 121 and 122, the series resistors 123, 123', and the diodes 124, 124' bear the same numbers as in FIG. 11 and function in the same manner to full-wave rectify the V and H components and add the resultant signals at point 126. Resistors 128, 128' and 129 are added to correct for the imperfections mentioned above. By properly selecting their values, particularly resistor 129, a minimum deviation from an average amplitude can be obtained.

The sum voltage at point 126 is supplied through resistor 131 to output resitsor 132, the latter being shunted by transistor 133. The V component is additionally full-wave rectified by diodes 134 to yield a signal of negative polarity. This signal and the positive full-wave rectified H component are fed through resistors 137, 137' to point 135 where they are subtracted, and the resultant signal used to control transistor 133 in the manner described above in connection with FIG. 9. In the region of 0° and 180° the negative V signal will predominate, and transistor 133 will be non-conducting. Accordingly the sum of the V and H components at point 26 will pass to the output circuit, as shown in FIG. 12a at 136 and 136'. In the region of 90° and 270° the positive H signal will predominate at point 135, thus causing transistor 133 to conduct and short-circuit the output resistor 132.

By introducing amplification or attenuation in the path of the V and H components to point 135, the phase-angle ranges during which transistor 133 is conductive and non-conductive may be altered as desired, thus changing the width of the pass regions 136, 136' in FIG. 12a. Instead of using the additional diodes 134 to full-wave rectify the V component, they could be used to full-wave rectify the H component with negative polarity. This, when subtracted from the positive V component, would give a gating signal which is positive in the region of 0° and 180°, thus interchanging the pass and rejection bands in FIG. 12a.

By comparing FIG. 12a with FIG. 9a the more uniform response within the pass regions is readily apparent. The arrangement of FIG. 12 is particularly useful when it is desired to have relatively wide pass sectors and narrow rejection sectors, and where all signals within the pass sectors are of equal importance.

The values of the resistors in FIG.12 may be selected to meet the requirements of the particular application. As an example for illustration only, in one embodiment resistors 123, 123', 128, 128', 137, 137' and 132 were 100K, resistor 129 was 200K, and resistor 131 was 10K. The resistance of the transformer secondaries is in series with respective resistors 123, 123', and was substantial in this instance, so that the overall ratio of series to shunt (load) resistance was substantially as set forth above.

Referring now to FIG. 13, a circuit is shown which is capable of functioning in the manner of several of the preceding embodiments by suitable switching. This embodiment is designed to provide output signals of negative polarity, rather than positive as in preceding embodiments. The principal components will be described before explaining the operation.

Triodes 141 and 141' receive V and H signals from the vertical and horizontal deflection amplifiers of FIG. 1, and function as cathode followers to deliver corresponding signals to center-tapped transformers 142 and 142'. In the V channel, diodes 143 are connected as a full-wave rectifier to produce output signals of negative polarity at line 144. Diodes 145 are similarly arranged as a full-wave rectifier but are oppositely poled to produce output signals of positive polarity at line 146. Similarly, in the horizontal channel diodes 147 produce output signals of negative polarity at line 148, and diodes 149 produce output signals of positive polarity at line 151.

Either polarity of the rectified H signal may be supplied through switches SW9 and SW10 to an attenuator 152 whose various switch positions are indicated as A, B, C and D. Similarly, in the vertical channel either polarity of the rectified V signal may be supplied by switches SW8 and SW11 to an attenuator 153 having switch positions E, F, G and H. The signals from the attenuators are combined through resistors 154 and 154' and the resultant supplied to line 155. Switch SW3, when closed, delivers this resultant signal through diode 156 to output line 157, also designated "Output II."

Switch SW5, when closed, delivers the resultant signal in line 155 to a transistor amplifier 158 functioning as an emitter follower, and the emitter is connected to the base of transistor 159. When switch SW6 is closed, transistor 159 shunts the output resistors 161, 161'. Terminal 162 is provided as a convenient point for actuating a recorder. The remaining components will be discussed in connection with the explanation of the operation.

The following types of outputs can be obtained by the arrangement of FIG. 13:

(1) A full-wave rectified V output (SW1 closed).
(2) A uniform amplitude all-phase output (SW2 closed).
(3) A subtractive output of V and H (switches SW3, 7, 10 and 11 closed).
(4) A phase-range limited output with a uniform pass-band (switches SW4, 5, 6, 8 and 9 closed).

To obtain the first type output, SW1 is closed as indicated in (1) above, the other switches remaining open. Accordingly the full-wave rectified V signal of negative polarity at line 144 is supplied through resistor 164, potentiometer 165 and resistor 166 to ground. The potentiometer permits adjusting the amplitude of the V signal at "Output I." The output characteristic will be the inverse of that shown at 47 in FIG. 4a. Terminals 167 are provided for connection to a recorder.

To obtain the second type output, SW2 is closed and SW1 opened, the other switches remaining open. Diodes 168, 168' and resistors 169, 169', 171 function like diodes 124, 124' and resistors 123, 123', 129 in FIG. 12, except that the diodes are reversed since the V and H signals to be added are of negative polarity from lines 144 and 148. This yields a characteristic for Output I like FIG. 11a, except inverted.

To obtain the third type output, switches SW3, 7, 10 and 11 are closed, the others being open. They may be ganged for simultaneous operation, but the mechanical connections are not shown in order to avoid confusion in the drawing. Closed SW10 supplies the positive H component at line 151 through attenuator 152 to line 155, and closed SW11 supplies the negative V component at line 144 through attenuator 153 to line 155. In the phase-angle range where the V component exceeds the H component, the resultant negative signal passes through closed SW3 and diode 156 to Output II. The characteristic is like those in FIG. 5a, except inverted. By adjusting attenuators 152 and 153, the ratio of V to H components may be altered to change the pass phase range, as explained in connection with FIGS. 5 and 5a.

Closed SW7 provides a path to ground for the junction of diodes 172, 172'. These diodes and the associated resistors 173, 173' and 174 are used for the fourth type of operation described below. In this third type of operation the closing of SW7 provides a load on the transformer secondaries similar to the loads thereon during other types of operation, thereby preventing the development of transients and reducing distortion.

The fourth type output is obtained by closing SW4, 5, 6, 8 and 9 (which may be ganged), and opening the others. For this type of operation a uniform all-phase characteristic of negative polarity is produced by diodes 172, 172' and resistors 173, 173', 174 in the same manner as above described for the second type. Closed SW4 supplies the resultant added V and H components, with negative polarity, to line 157 and Output II.

Closed SW8 and SW9 supply the positive rectified V component and the negative rectified H component through respective attenuators 153, 152 to line 155. Closed SW5 supplies the resultant difference voltage to transistor 158 and thence to the base of transistor 159. Closed SW6 places the latter across the output resistors 161, 161'. Transistor 159 is here shown as a PNP type to agree with the negative signal applied to its collector, and becomes highly conductive when its base goes negative to its emitter. Accordingly, while the positive V component at line 155 exceeds the negative H component, the resultant positive voltage is supplied to the base of transistor 159 (without inversion in transistor 158) and 159 is nonconductive. This allows the signal in line 157 to pass to Output II. When the H component at line 155 exceeds the V component, a negative voltage is supplied to the base of transistor 159 and it becomes conductive to short-circuit the output to ground. Thus the Output II is gated in the manner described in connection with FIG. 12, and the gated characteristic will be like that shown in FIG. 12a, except inverted.

By adjusting attenuators 152 and 153, the relative amplitudes of the V and H components at line 155 may be changed, thus changing the gating action of transistor 159 so as to alter the widths of the phase pass and rejection bands, as described in connection with FIG. 12.

The specific embodiments shown are arranged to function in eddy current test apparatus wherein the object under test passes through the test coil assembly to generate signals of varying amplitude and phase depending on defects or flaws therein. Thus A-C coupling in the phase-range limiting circuits, such as provided by the transformers therein, may be employed. In comparator types of test apparatus mentioned hereinbefore, wherein an object is placed in the coil assembly and a signal obtained without relative movement of object and coil assembly, the A-C signal from the coil assembly will be constant during the measurement but the amplitude and phase thereof will depend on any defects or flaws in the object. After quadrature detection, the resultant V and H components will be D-C signals whose magnitude and polarity depend on the original signal amplitude and phase. Thus D-C coupling would be employed in the phase-range limiting circuits. In subtracting, for example, the D-C level of the H component may be subtracted from that of the V component, or vice versa, and provision made so that an output is obtained only when one exceeds the other.

Shunt transistors have been used as gate circuits in the foregoing embodiments. However, other types of gate circuits may be employed if desired, and they may be in series or shunt with the output line. Diode polarities may be selected to yield gate signals of appropriate polarity and phase range occurrence. For subtraction, series subtracting circuits may be employed rather than the parallel arrangements shown. Also, in the foregoing embodiments diodes have been used as unidirectional conductive devices, both in the rectifier circuits and to limit outputs to a desired polarity. Other suitable devices may be used if desired, to meet the requirements of the particular application.

These and other modifications may be made by those skilled in the art within the spirit and scope of the invention.

The specific embodiments described are in eddy current testing apparatus, wherein the phase-range limiting is especially useful. However, the arrangements described could also be used in other environments where quadrature signal components are available or can be produced, and it is desired to limit the phase-angle response range. Also, the all-phase arrangement of FIG. 11 may be useful for some applications without gating.

We claim:

1. In eddy current testing apparatus including test coil means connected to a source of alternating current for inducing eddy currents in an object under test and producing an alternating output signal whose amplitude and phase change with defects or flaws in the object, means for limiting the range of phase angles within which signals are supplied to an output circuit for indication or recording which comprises (a) means utilizing said source of alternating current and said alternating output signal for producing quadrature signal components thereof,
    (b) means responsive to said quadrature signal components for producing a gate signal when the relative amplitudes of said quadrature components lie within a predetermined range corresponding to a limited phase angle range of said components,
    (c) a gate circuit having an input supplied with at least one of said quadrature signal components and an output,
    (d) and means for supplying said gate signal to said said gate circuit to limit the output thereof to signals lying within a restricted range of phase angles.

2. Apparatus in accordance with claim 1 in which said means for producing a gate signal includes a cathode-ray tube supplied with said quadrature signal components for producing a polar display of the signal represented thereby, a mask positioned over the face of said cathode-ray tube having an open sector for displaying signals within a limited phase angle range, and photosensitive means responsive to signals within said open sector for producing said gate signal.

3. Apparatus in accordance with claim 1 in which said means for producing a gate signal includes rectifying means for rectifying each of said quadrature signal components to produce respective rectified signals, subtracting means for subtracting from one of said rectified quadrature signal components the other rectified quadrature signal component to reduce the amplitude of said one component as a function of the phase angle of the signal represented thereby, and means for utilizing the output of said subtracting means as said gate signal.

4. Apparatus in accordance with claim 3 in which said rectifying means are full-wave rectifiers for said quadrature signal components respectively.

5. Apparatus in accordance with claim 3 including means for supplying said rectified quadrature signal components to said subtracting means with relatively different amplifications to produce a gate signal having alternate pass and reject portions less than and greater than 90°, respectively.

6. Apparatus in accordance with claim 1 including a pair of full-wave rectifier circuits supplied with said quadrature signal components, respectively, for producing respective full-wave rectified outputs, and means for adding said rectified outputs in like polarity to produce a resultant output whose amplitude is approximately independent of the phase of the signal represented thereby, said resulting output being supplied to the input of said gate circuit.

7. In eddy current testing apparatus including test coil means connected to a source of alternating current for inducing eddy currents in an object under test and producing an alternating output signal whose amplitude and phase change with defects or flaws in the object, means for limiting the range of phase angles within which signals are supplied to an output circuit for indication or recording which comprises (a) means utilizing said source of alternating current and said alternating output signal for producing quadrature signal components thereof,
    (b) first and second rectifying means for rectifying said quadrature signal components respectively,
    (c) subtracting means for subtracting from a rectified output of one of said rectifying means a rectified output of the other rectifying means to produce a resultant signal having an amplitude and polarity dependent on the phase angle of the signal represented by said quadrature components,
    (d) an output circuit and means for supplying thereto a rectified output of one of said rectifying means,
    (e) and means for utilizing said resultant signal to gate said output circuit to limit the output thereof to signals lying within a restricted range of phase angles.

8. Apparatus in accordance with claim 7 in which said first rectifying means includes means for producing two full-wave rectified outputs of opposite polarity, one of said rectified outputs of one polarity being supplied to said output circuit and the other of opposite polarity being supplied to said subtracting means, and said second rectifying means produces a full-wave rectified output of said one polarity which is supplied to said subtracting means.

9. Apparatus in accordance with claim 7 in which said first rectifying means produces a full-wave rectified output of one polarity which is supplied to said output circuit and to said subtracting means, and said second rectifying means produces a full-wave output opposite in polarity to said one polarity which is supplied to said subtracting means.

10. In eddy current testing apparatus including test coil means connected to a source of alternating current for inducing eddy currents in an object under test and producing an alternating output signal whose amplitude and phase change with defects or flaws in the object, means for limiting the range of phase angles within which signals are supplied to an output circuit for indication or recording which comprises
(a) means utilizing said source of alternating current and said alternating output signal for producing quadrature signal components thereof,
(b) rectifier means for rectifying each of said quadrature signal components to produce full-wave rectified outputs of like polarity for both components and a rectified output of opposite polarity for one component,
(c) adding means for adding said full-wave rectified outputs of like polarity to produce a resultant output whose amplitude is approximately independent of the phase of the signal represented thereby,
(d) a gate circuit and means for supplying said resultant output thereto,
(e) subtracting means supplied with rectified outputs of the quadrature signal components from said rectifier means in opposite polarity to reduce the amplitude of one component as a function of the phase angle of the signal represented thereby,
(f) and means for utilizing the output of said subtracting means to gate said gate circuit and limit the output thereof to signals lying within a restricted range of phase angles.

11. Apparatus in accordance with claim 10 in which said adding means includes a pair of series circuits each including resistance and a unidirectional conductive device for supplying respective full-wave rectified outputs to said gate circuit, and a shunt circuit including resistance connected in common with the output ends of said pair of series circuits.

12. Apparatus in accordance with claim 11 in which the effective resistances of said series circuits are substantially equal and substantially exceed the resistance of said shunt circuit.

13. In eddy current testing apparatus including test coil means connected to a source of alternating current for inducing eddy currents in an object under test and producing an alternating output signal whose amplitude and phase change with defects or flaws in the object, means for limiting the range of phase angles within which signals are supplied to an output circuit for indication or recording which comprises
(a) means utilizing said source of alternating current and said alternating output signal for producing quadrature signal components thereof,
(b) rectifying means for rectifying each of said quadrature signal components to produce respective rectified signals,
(c) subtracting means for subtracting from one of said rectified quadrature signal components the other rectified quadrature signal component to reduce the amplitude of said one component as a function of the phase angle of the signal represented thereby,
(d) and output means for supplying said one rectified quadrature signal component from said subtracting means to an output circuit.

14. Apparatus in accordance with claim 13 in which said output means includes means for substantially preventing the passage of signals having a polarity opposite to the polarity of said one rectified signal component supplied thereto.

15. Apparatus in accordance with claim 14 in which each of said rectifying means is a full-wave rectifier.

16. Apparatus in accordance with claim 14 including means for supplying said rectified quadrature signal components to said subtracting means with the relative amplification of said other signal component substantially greater than that of said one signal component to thereby limit output signals to phase angle ranges substantially less than $\pm 45°$ from an angle at which there is no substantial reduction in amplitude of said one rectified signal component.

17. Apparatus in accordance with claim 14 in which said rectifying means produces half-wave rectification of at least one of said quadrature signal components.

18. Apparatus in accordance with claim 14 in which said rectifying means produces half-wave rectification for said one rectified quadrature signal component and full-wave rectification for said other.

19. Apparatus in accordance with claim 14 including means for biasing said other rectified quadrature signal component to prevent the subtraction thereof from said one rectified quadrature signal component until the amplitude thereof exceeds the bias level.

20. In eddy current testing apparatus including test coil means connected to a source of alternating current for inducing eddy currents in an object under test and producing an alternating output signal whose amplitude and phase change with defects or flaws in the object, means for limiting the range of phase angles within which signals are supplied to an output circuit for indication or recording which comprises
(a) means utilizing said source of alternating current and said alternating output signal for producing quadrature signal components thereof,
(b) a pair of half-wave rectifiers for one of said quadrature signal components poled to produce rectified signals of opposite polarity for opposite phases thereof,
(c) a pair of full-wave rectifiers for the other of said quadrature signal components poled to produce rectified signals of opposite polarity,
(d) subtracting means for subtracting respective full-wave rectified signals of said other quadrature signal component from respective half-wave rectified signals of said one component to reduce the amplitudes of the half-wave rectified signals as a function of the phase angle of the signal represented thereby,
(e) and means for supplying to an output circuit the respective outputs of said subtracting means having polarities corresponding to the polarities of said one quadrature signal component therein and rejecting respective opposite polarities.

21. Apparatus for receiving quadrature components of signals having different phase angles and limiting the range of phase angles within which signals are supplied to an output circuit which comprises means responsive to both said quadrature signal components for producing a gate signal when the relative amplitudes of said quadrature components lie within a predetermined range corresponding to a limited phase angle range of said components, a gate circuit having an input supplied with at least one of said quadrature signal components and an output, and means for supplying said gate signal to said gate circuit to limit the output thereof to signals lying within a restricted range of phase angles.

22. Apparatus in accordance with claim 21 in which said means for producing a gate signal includes rectifying means for rectifying each of said quadrature signal components to produce respective rectified signals, subtracting means for subtracting from one of said rectified quadrature signal components the other rectified quadrature signal component to reduce the amplitude of said one component as a function of the phase angle of the signal represented thereby, and means for utilizing the output of said subtracting means as said gate signal.

23. Apparatus in accordance with claim 21 including a pair of full-wave rectifier circuits supplied with said quadrature signal components, respectively, for producing respective full-wave rectified outputs, and means for adding said rectified outputs in like polarity to produce a resultant output whose amplitude is approximately independent of the phase of the signal represented thereby, said resultant output being supplied to the input of said gate circuit.

24. Apparatus for receiving quadrature components of signals having different phase angles and limiting the range of phase angles within which signals are supplied to an output circuit which comprises
 (a) rectifier means for rectifying each of said quadrature signal components to produce full-wave rectified outputs of like polarity for both components and a rectified output of opposite polarity for one component,
 (b) adding means including a pair of series circuits each including resistance and a unidirectional conductive device for receiving said full-wave rectified outputs and a shunt output circuit including resistance connected in common with the output ends of said pair of series circuits,
 (c) the resistance in said series and shunt circuits being predetermined to produce a resultant output whose amplitude is approximately independent of signal phase,
 (d) a gate circuit and means for supplying said resultant output thereto,
 (e) subtracting means supplied with rectified outputs of the quadrature signal components from said rectifier means in opposite polarity to reduce the amplitude of one component as a function of the phase angle of the signal represented thereby,
 (f) and means for utilizing the output of said subtracting means to gate said gate circuit and limit the output thereof to signals lying within a restricted range of phase angles.

25. Apparatus for receiving quadrature components of signals having different phase angles and limiting the range of phase angles within which signals are supplied to an output circuit which comprises rectifying means for rectifying each of said quadrature signal components to produce respective rectified signals, subtracting means for subtracting from one of said rectified quadrature signal components the other rectified quadrature signal component to reduce the amplitude of said one component as a function of the phase angle of the signal represented thereby, and output means for supplying said one rectified quadrature signal component from said subtracting means to an output circuit.

26. Apparatus in accordance with claim 25 in which said output means includes means for substantially preventing the passage of signals having a polarity opposite to the polarity of said one rectified signal component supplied thereto.

27. Apparatus in accordance with claim 26 including means for supplying said rectified quadrature signal components to said subtracting means with the relative amplification of said other signal component substantially greater than that of said one signal component to thereby limit output signals to phase angle ranges substantially less than ±45° from an angle at which there is no substantial reduction in amplitude of said one rectified signal component.

28. Apparatus for receiving quadrature components of signals having different phase angles and limiting the range of phase angles within which signals are supplied to an output circuit which comprises
 (a) a pair of half-wave rectifiers for each of said quadrature signal components,
 (b) each pair of rectifiers being poled to produce rectified half-wave signals of like polarity for opposite phases of the corresponding quadrature signal component,
 (c) subtracting means for separately subtracting from respective half-wave rectified signals of one of said quadrature signal components the respective half-wave rectified signals of the other to reduce the amplitudes of the rectified signals of said one component as a function of the phase angle of the signal represented thereby,
 (d) and means for supplying to an output circuit the outputs of said subtracting means having a polarity corresponding to the rectified signal of said one component and rejecting outputs of opposite polarity.

29. Apparatus for receiving quadrature components of signals having different phase angles and producing an output whose amplitude is approximately independent of phase which comprises
 (a) first and second full-wave rectifier circuits supplied with said quadrature signal components, respectively, for producing respective full-wave rectified outputs of the same polarity,
 (b) a common output circuit including resistance,
 (c) and a pair of series circuits each including resistance and a unidirectional conductive device for supplying respective outputs of said rectifier circuits to said common output circuit in additive relationship.

30. Apparatus in accordance with claim 29 in which the effective resistances of said series circuits are substantially equal and substantially exceed the resistance of said common output circuit.

31. In eddy current testing apparatus including test coil means connected to a source of alternating current for inducing eddy currents in an object under test and producing an alternating output signal whose amplitude and phase change with defects or flaws in the object, means for limiting the range of phase angles within which signals are supplied to an output circuit for indication or recording which comprises
 (a) means utilizing said source of alternating current and said alternating output signal for producing quadrature signal components thereof,
 (b) subtracting means for subtracting from one of said quadrature signal components the other quadrature signal component to reduce the amplitude of said one component as a function of the phase angle of the signal represented thereby,
 (c) and output means for supplying said one rectified quadrature signal component from said subtracting means to an output circuit.

References Cited

UNITED STATES PATENTS 2,971,086 2/1961 Feijoo et al. 328—133
3,300,783 1/1967 Ziehm 324—88 X RUDOLPH V. ROLINEC, *Primary Examiner.*

P. A. URIBE, *Assistant Examiner.*